United States Patent

Inagaki

(10) Patent No.: US 10,135,925 B2
(45) Date of Patent: Nov. 20, 2018

(54) NON-TRANSITORY COMPUTER-READABLE MEDIUM, TERMINAL, AND METHOD

(71) Applicant: Brother Kogyo Kabushiki Kaisha, Nagoya-shi, Aichi-ken (JP)

(72) Inventor: Tomohiro Inagaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 378 days.

(21) Appl. No.: 14/757,440

(22) Filed: Dec. 23, 2015

(65) Prior Publication Data

US 2016/0191577 A1 Jun. 30, 2016

(30) Foreign Application Priority Data

Dec. 26, 2014 (JP) .................................. 2014-265186

(51) Int. Cl.
H04L 29/06 (2006.01)
H04L 29/08 (2006.01)

(52) U.S. Cl.
CPC ...... *H04L 67/1097* (2013.01); *H04L 65/4023* (2013.01); *H04L 65/4038* (2013.01)

(58) Field of Classification Search
CPC ............. H04L 67/1097; H04L 65/4023; H04L 65/4038
See application file for complete search history.

(56) References Cited

U.S. PATENT DOCUMENTS

| | | | | |
|---|---|---|---|---|
| 2004/0253991 | A1* | 12/2004 | Azuma | H04M 3/567 455/566 |
| 2006/0023063 | A1* | 2/2006 | Okawa | H04N 7/15 348/14.09 |
| 2007/0280464 | A1* | 12/2007 | Hughes | H04M 7/003 379/205.01 |
| 2011/0222676 | A1* | 9/2011 | Okada | H04N 7/147 379/93.21 |
| 2013/0210397 | A1* | 8/2013 | Nakajima | H04W 8/22 455/414.1 |

(Continued)

FOREIGN PATENT DOCUMENTS

| | | |
|---|---|---|
| JP | 2006-039919 A | 2/2006 |
| JP | 2006-134094 A | 5/2006 |
| JP | 2010-141662 A | 6/2010 |

*Primary Examiner* — Wing F Chan
*Assistant Examiner* — Billy H Ng
(74) *Attorney, Agent, or Firm* — Banner & Witcoff, Ltd.

(57) ABSTRACT

A non-transitory computer-readable medium stores computer-readable instructions. The instructions, when executed by a processor of a presenter terminal configured to be connectable to a network, cause the presenter terminal to execute receiving specific data relating to each of one or more participant terminals, storing identification information and position information in association with each other, and transmitting, to a participant terminal, a command to display document data on a display of the participant terminal. The instructions executed by the processor further including receiving state information indicating a display state on the display of the participant terminal, identifying position information associated with identification information of the participant terminal, based on the identification information and the position information stored in the storage, and displaying a corresponding image in an identified position.

11 Claims, 10 Drawing Sheets

(56) References Cited

U.S. PATENT DOCUMENTS

2015/0058748 A1\* 2/2015 Huang .................. H04L 65/403
715/753
2016/0127688 A1\* 5/2016 Inoue ..................... H04N 7/152
348/14.08

\* cited by examiner

# NON-TRANSITORY COMPUTER-READABLE MEDIUM, TERMINAL, AND METHOD

CROSS-REFERENCE TO RELATED APPLICATION

This application claims priority to Japanese Patent Application No. 2014-265186 filed Dec. 26, 2014, the content of which is hereby incorporated herein by reference.

BACKGROUND

The present disclosure relates to a non-transitory computer-readable medium, a terminal, and a method that are capable of performing a remote conference by performing communication via a network.

A system is proposed in which a remote conference is performed in a virtual conference room between users of a plurality of terminals connected to a network. In the remote conference, there is a case in which document data is shared and displayed on the terminal of each of the participants. In this case, a presenter, who is making an explanation to the participants, makes the explanation while referring to the shared document data. It is here assumed that a display screen of the terminal of the participant displays data that is different from data displayed on a display screen of a terminal of the presenter, such as document data that is different from document data of the presenter. In this case, it is possible that the explanation by the presenter is not properly conveyed to the participant. In a known system, the plurality of terminals share and display an image via the network. A dotted line frame or the like that shows an area of a shared image displayed on a display screen of a first terminal is displayed such that the dotted line frame or the like is superimposed on the shared image displayed on a display screen of a second terminal. Thus, a user of the second terminal can know which area of the shared image is displayed on the display screen of the first terminal.

SUMMARY

Embodiments provide a non-transitory computer-readable medium storing computer-readable instructions. The instructions, when executed by a processor of a first terminal configured to be connectable to a network, causes the first terminal to execute a first reception operation of receiving, by a communication interface of the first terminal, specific data relating to each of other terminals, the first terminal and the other terminals participating in a remote conference by performing transmission and reception of data via the network, a storage operation of storing, in a storage, identification information and position information in association with each other, the identification information indicating each of the other terminals, and the position information indicating a position in which the specific data is displayed on a first display of the first terminal, a display command operation of transmitting, to a second terminal by the communication interface, a command to display document data on a second display of the second terminal, the other terminals including the second terminal, a second reception operation of receiving state information from the second terminal by the communication interface, the state information indicating a display state on the second display, an identification operation of identifying position information associated with identification information of the second terminal, based on the identification information and the position information stored in the storage, and a display operation of displaying a corresponding image in an identified position, the corresponding image being an image corresponding to the state information, and the identified position being a position, of a screen displayed in the first display, indicated by the position information identified by the identification operation.

Embodiments further provide a first terminal configured to be connectable to a network. The first terminal includes a first display, a communication interface, a processor, and a memory. The memory is configured to store computer-readable instructions. The computer-readable instructions, when executed by the processor, cause the first terminal to execute a first reception operation of receiving, by the communication interface, specific data relating to each of other terminals, the first terminal and the other terminals participating in a remote conference by performing transmission and reception of data via the network, a storage operation of storing, in a storage, identification information and position information in association with each other, the identification information indicating each of the other terminals, and the position information indicating a position in which the specific data is displayed on the first display, a display command operation of transmitting, to a second terminal, a command to display document data on a second display of the second terminal, the other terminals including the second terminal, a second reception operation of receiving state information from the second terminal by the communication interface, the state information indicating a display state on the second display, an identification operation of identifying position information associated with identification information of the second terminal, based on the identification information and the position information stored in the storage, and a display operation of displaying a corresponding image in an identified position, the corresponding image being an image corresponding to the state information, and the identified position being a position, of a screen displayed in the first display, indicated by the position information identified by the identification operation.

Embodiments also provide a method of controlling a first terminal configured to be connectable to a network. The method includes a first reception operation of receiving, by a communication interface of the first terminal, specific data relating to each of other terminals, the first terminal and the other terminals participating in a remote conference by performing transmission and reception of data via the network, a storage operation of storing, in a storage, identification information and position information in association with each other, the identification information indicating each of the other terminals, and the position information indicating a position in which the specific data is displayed on a first display of the first terminal, a display command operation of transmitting, to a second terminal by the communication interface, a command to display document data on a second display of the second terminal, the other terminals including the second terminal, a second reception operation of receiving state information from the second terminal by the communication interface, the state information indicating a display state on the second display, an identification operation of identifying position information associated with identification information of the second terminal, based on the identification information and the position information stored in the storage, and a display operation of displaying a corresponding image in an identified position, the corresponding image being an image corresponding to the state information, and the identified position being a position, of a screen displayed in the first display, indicated by the position information identified by the identification operation.

BRIEF DESCRIPTION OF THE DRAWINGS

Embodiments will be described below in detail with reference to the accompanying drawings in which.

DETAILED DESCRIPTION

A case can be conceived in which a plurality of terminals display a shared image. In the above known system, it is possible that a presenter cannot know whether the shared image is appropriately displayed on each of the plurality of terminals displaying the shared image. For example, when there is the terminal on which the shared image is not appropriately displayed, there is a possibility that it is difficult to identify which of the plurality of terminals is not appropriately displaying the shared image.

Embodiments of the broad principles derived herein provide a non-transitory computer-readable medium, a terminal, and a method that allow a presenter to appropriately know, in a remote conference, whether an appropriate image is being displayed on each of a plurality of terminals.

[Overview of Remote Conference System 1]

Figure 1:
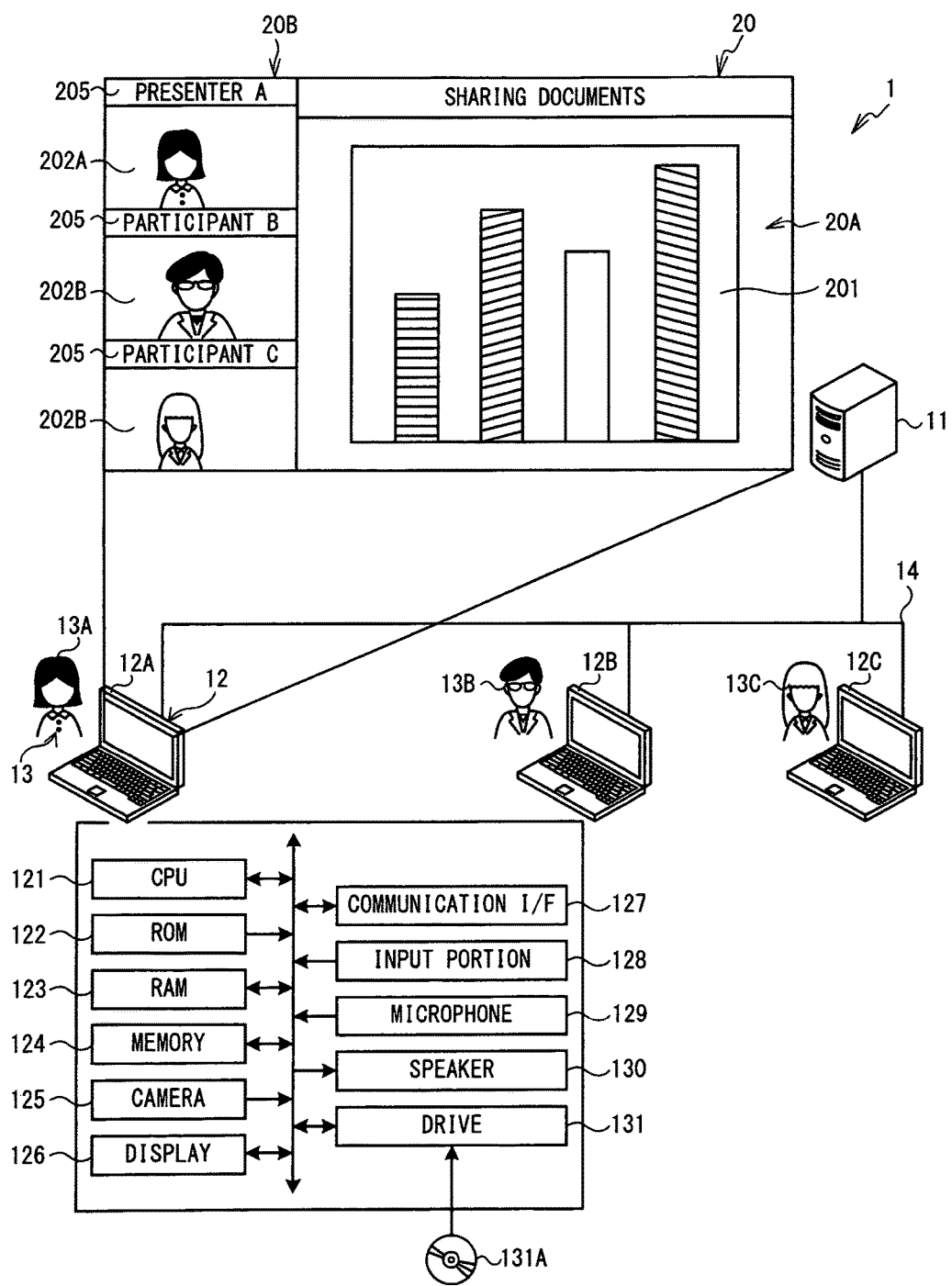
FIG. 1 is a diagram showing an overview of a remote conference system and an electrical configuration of a terminal.

A remote conference system 1 will be explained with reference to FIG. 1. The remote conference system 1 includes a server 11 and terminals 12A to 12C. The terminals 12A to 12C are collectively referred to as the terminals 12. The server 11 and the terminals 12 are connected via a network 14. The remote conference system 1 provides a virtual conference room to users of the respective terminals 12, and a remote conference can thus be held between the users.

The server 11 is, for example, a known multi-point control unit (MCU). The terminal 12 is configured by installing a program of an application to perform a remote conference in a known general-purpose personal computer (PC). Hereinafter, the application to perform the remote conference is referred to as a conference application. Hereinafter, the users of the terminals 12A to 12C are respectively referred to as users 13A to 13C. The users 13A to 13C are collectively referred to as the users 13. The server 11 may be a general-purpose server. At least one of the terminals 12 may be configured by installing the program of the conference application in a dedicated terminal for the remote conference.

[Electrical Configuration of Terminal 12]

An electrical configuration of the terminal 12 will be explained with reference to FIG. 1. The terminal 12 is connected to the server 11 via the network 14. The terminal 12 includes a CPU 121, which controls the terminal 12. The CPU 121 is electrically connected to a ROM 122, a RAM 123, a memory 124, a camera 125, a display 126, a communication interface (I/F) 127, an input portion 128, a microphone 129, a speaker 130, and a drive 131. The ROM 122 stores a boot program, a basic input/output system (BIOS), and the like. The RAM 123 stores temporary data etc., such as information of a timer, a counter, and a display flag, which will be explained below. The memory 124 is a computer-readable non-transitory storage medium, such as a hard disk or the like. The memory 124 stores the program of the conference application and an operating system (OS). For example, the memory 124 may be a flash memory and/or a ROM etc. It is sufficient that the non-transitory storage medium be able to store information, irrespective of a period of time of storing the information. The non-transitory storage medium need not necessarily include a transitory storage medium (a transmission signal, for example).

The display 126 is a liquid crystal display (LCD). The communication I/F 127 is, for example, an interface element (a LAN card or the like, for example) that connects the terminal 12 to the network 14. The communication I/F 127 may be an interface element (such as a Wi-Fi communication modem, for example) that performs wireless communication by being connected to an access point (not shown in the drawings) by which the terminal 12 is connected to the network 14. Via the communication I/F 127, the CPU 121 performs transmission and reception of data with other devices connected to the network 14. Examples of the input portion 128 include, for example, a button, a keyboard, a mouse, a touch panel, etc. The drive 131 can read out information stored in a computer-readable storage medium 131A, such as an optical disk, a semi-conductor memory or the like. The CPU 121 can use the drive 131 to read out a program stored in the storage medium 131A, and store the program in the memory 124.

A general-purpose processor may be used as the CPU 121. Part of processing executed by the CPU 121 may be executed by another electronic component (an application specific integrated circuit (ASIC), for example). The processing executed by the CPU 121 may be performed through distributed processing by a plurality of electronic devices (a plurality of CPUs, for example). The program may be downloaded (transmitted as a transmission signal, for example) from a separate server connected to the network 14, and stored in the memory 124, for example. In this case, the program is stored in a non-transitory storage medium, such as a hard disk, provided in the separate server.

[Overview of conference room]

An explanation will be given using a specific example of a procedure when the users 13 of the terminals 12 use a virtual conference room provided by the server 11. Hereinafter, the virtual conference room provided by the server 11 is simply referred to as the conference room. First, when the CPU 121 of the terminal 12A detects that a user ID and a password of the user 13A has been input via the input portion 128, the user 13A is caused to log in to the remote conference system 1. The terminals 12B and 12C are used by the users 13B and 13C, respectively. In order to invite the users 13B and 13C to the conference room hosted by the user 13A, the CPU 121 of the terminal 12A transmits an electronic mail (email) addressed to the email addresses of the terminals 12B and 12C. The email includes a uniform resource locator (URL) that is necessary for the users 13B and 13C to participate in the conference room. The URL includes a conference ID, which distinguishes the conference room, in a query string. When a password has been set for the conference room, the URL may include password information, which represents the password, in the query string.

Next, when the CPU 121 of the terminal 12A detects a command to activate the conference application via the input portion 128, the CPU 121 of the terminal 12A activates the conference application. When the CPU 121 of the terminal 12A detects an input operation to enter the conference room hosted by the user 13A, the CPU 121 of the terminal 12A transmits the conference ID of the conference room hosted by the user 13A to the server 11. The CPU 121 of the terminal 12A performs communication with the server 11, and executes conference connection processing. As a result of the conference connection processing, the server 11 establishes a session with the terminal 12A for the conference room indicated by the conference ID.

Meanwhile, the CPU 121 of the terminal 12B receives the email transmitted from the terminal 12A, and displays the URL on the display 126. When the CPU 121 of the terminal 12B detects that the URL has been selected via the input portion 128, the CPU 121 of the terminal 12B activates the conference application. The CPU 121 of the terminal 12B transmits the conference ID included in the URL to the server 11. The CPU 121 of the terminal 12B performs communication with the server 11, and executes the conference connection processing. As a result of the conference connection processing, the server 11 establishes a session with the terminal 12B for the conference room indicated by the conference ID. The same operation as on the terminal 12B is performed on the terminal 12C.

As described above, the server 11 establishes the session with the terminals 12 for the conference room indicated by the conference ID. In this state, the users 13A to 13C participate in the conference room hosted by the user 13A. By the conference application being executed by the CPU 121 of the terminal 12, a conference application window 20, which is shown in FIG. 1, is displayed on the display 126. Further, by the conference application being executed by the CPU 121 of the terminal 12, audio collected by the microphone 129 of another of the terminals 12 is output from the speaker 130. It is possible to perform the remote conference with the other users 13 while each of the users 13 checks videos and audio of the other users 13 participating in the conference room hosted by the user 13A.

The above-described conference application can provide a plurality of functions relating to the conference room to the users 13. One of the plurality of functions is a document sharing function. The document sharing function is a function that displays, in a document window 20A of the conference application window 20, document data being shared with the other terminals 12.

A person making an explanation using the shared document data is the user of the terminal 12 that activates the document sharing function on the conference application, and is referred to as a presenter. A person referring to the shared document data and listening to the explanation of the presenter is referred to as a participant. In the conference application, authorization is respectively set on the terminals 12 of the presenter and the participant. For example, by the user 13 hosting the conference room, a setting is made on the terminal 12 of the presenter such that execution of the document sharing function is approved. By the user 13 hosting the conference room, a setting is made on the terminal 12 of the participant such that the execution of the document sharing function is not approved. Hereinafter, a specific case will be explained in which the user 13A activates the document sharing function via the terminal 12A. In this case, the user 13A uses a document to be shared in order to make an explanation to the users 13B and 13C. The user 13A, who is the presenter, is referred to as the presenter 13A. The users 13B and 13C, who are the participants, are referred to, respectively, as the "participants" 13B and 13C.

[Display Modes of Conference Application Window 20]

Display modes of the conference application window 20 will be explained using specific examples, and with reference to FIG. 1 to FIG. 3. As shown in FIG. 1, the conference application window 20 includes the document window 20A and a video window 20B. When the document sharing function is executed, a document data image 201 based on the document data is displayed in the document window 20A. The document data image 201 is an image displayed based on the document data.

Normally, video data 202A and 202B, and display names 205 are displayed in the video window 20B. The video data 202A reproduces an image captured by the camera 125 of the terminal 12A. The video data 202B reproduces images that are captured by the cameras 125 of the terminals 12B and 12C and transmitted to the terminal 12A. The display name 205 is a character string registered in advance by the user 13. For example, the display names 205 of the presenter 13A and the participants 13B and 13C are, respectively, Presenter A, Participant B, and Participant C. The display names 205 are displayed above each of the video data 202A and 202B. The video data 202A and 202B and the display names 205 are displayed based on position information that will be described below.

For example, when the terminal 12A executes the document sharing function, the document data is transmitted to the terminals 12B and 12C. FIG. 2 shows an example of the display mode of the conference application window 20 displayed on the display 126 of the terminal 12A immediately after the document data is transmitted to the terminals 12B and 12C. As shown in FIG. 2, either a display data image 203 or a notification image 204 is displayed in a position in which the video data 202B of the video window 20B was previously displayed.

Here, a case is assumed in which the document data image 201 is appropriately displayed in the document window 20A in one of the terminal 12B and the terminal 12C. In this case, the display data image 203 is displayed in the video window 20B of the terminal 12A, based on position information of the one of the terminal 12B and the terminal 12C. The display data image 203 is an image that reproduces the document data image 201 displayed in the document window 20A of the one of the terminal 12B and the terminal 12C.

On the other hand, a case is assumed in which the document data image 201 is not appropriately displayed in the document window 20A in one of the terminal 12B and the terminal 12C. In this case, in the terminal 12A, the notification image 204 is displayed such that the notification image 204 is superimposed on the video window 20B of the terminal 12A, based on the position information of the one of the terminal 12B and the terminal 12C. The notification image 204 is, for example, an exclamation mark. However, the notification image 204 is not limited to this example. For example, the notification image 204 may be a mark that is selected and set in advance by the user from among various marks. The notification image 204 may be a thumbnail of the display data image 203, for example. The document data image 201 is always appropriately displayed in the document window 20A of the terminal 12A. Therefore, neither the display data image 203 nor the notification image 204 is displayed in a position in which the video data 202A is displayed.

Figure 2:
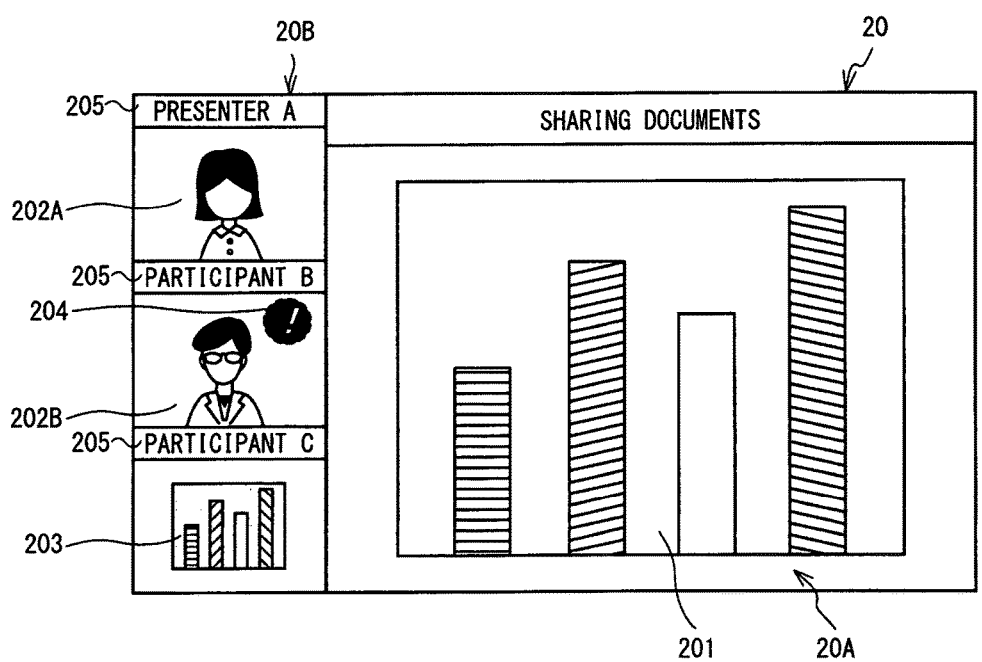
FIG. 2 is a diagram showing an example of a display mode of a conference application window.

In the example shown in FIG. 2, in the document window 20A of the terminal 12C corresponding to a position in which the display data image 203 is displayed, the document data image 201 is appropriately displayed based on the document data transmitted from the terminal 12A to the terminal 12C. In the document window 20A of the terminal 12B corresponding to a position in which the notification image 204 is displayed, the document data image 201 is not appropriately displayed based on the document data transmitted from the terminal 12A to the terminal 12B.

Figure 3:
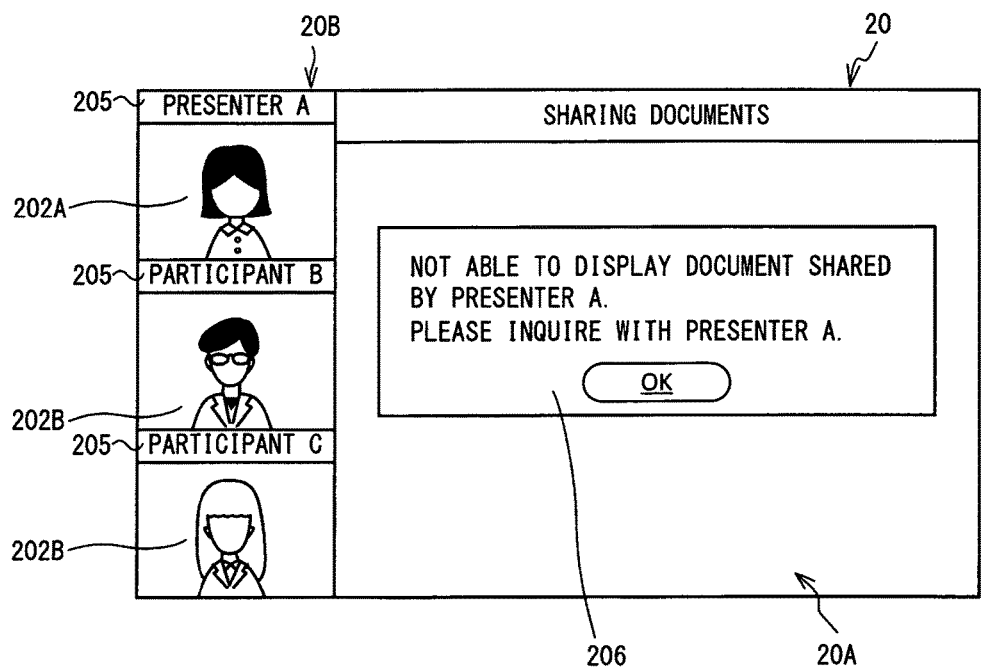
FIG. 3 is a diagram showing an abnormality notification image displayed in the conference application window.

FIG. 3 shows an example of a display mode of the conference application window 20 displayed on the display 126 of the terminal 12B. For example, it is assumed that the document data is transmitted from the terminal 12A to the terminals 12B and 12C and that the document data image 201 based on the transmitted document data is not appropriately displayed on the display 126 of the terminal 12B. In this case, the conference application window 20 exemplified in FIG. 3 is displayed on the display 126 of the terminal 12B. An abnormality notification image 206 is displayed in a central portion of the conference application window 20. The abnormality notification image 206 is an image indicating that the document data image 201 based on the document data transmitted from the terminal 12A is not appropriately displayed on the display 126 of the terminal 12 of the participant.

[Detailed Processing by CPU 121 of Terminal 12]

The display flag stored in the RAM 123 is used in processing executed by the CPU 121 of the terminal 12. The display flag is a flag that indicates the display mode of the image displayed in the video window 20B. When the video data 202B is to be displayed in the video window 20B, "0" is stored as the display flag in the RAM 123. When the display data image 203 is to be displayed in the video window 20B, "1" is stored as the display flag in the RAM 123. When the document sharing function is activated, "0" is stored as the display flag in the RAM 123.

Main processing will be explained with reference to FIG. 4. The main processing is started by the CPU 121 of the terminal 12 participating in the conference room, when the conference application is activated. In the above-described specific example, the main processing is executed by the CPUs 121 of the terminals 12A to 12C. Hereinafter, an example will be specifically explained in which the user 13A is the presenter, designates specific document data, and activates the document sharing function via the terminal 12A. The conference application is activated, for example, in the following two cases. The first case is a case in which the CPU 121 of the terminal 12 detects, via the input portion 128, the command to activate the conference application. In this case, with respect to the activated conference application, the conference ID and the password necessary to participate in the conference room are input via the input portion 128. The second case is a case in which the CPU 121 of the terminal 12 detects, via the input portion 128, that an URL necessary to participate in the conference room has been selected. When it has been detected, via the input portion 128, that the URL necessary to participate in the conference room has been selected and the conference application has not been installed in the terminal 12, the CPU 121 of the terminal 12 installs and activates the conference application.

Figure 4:
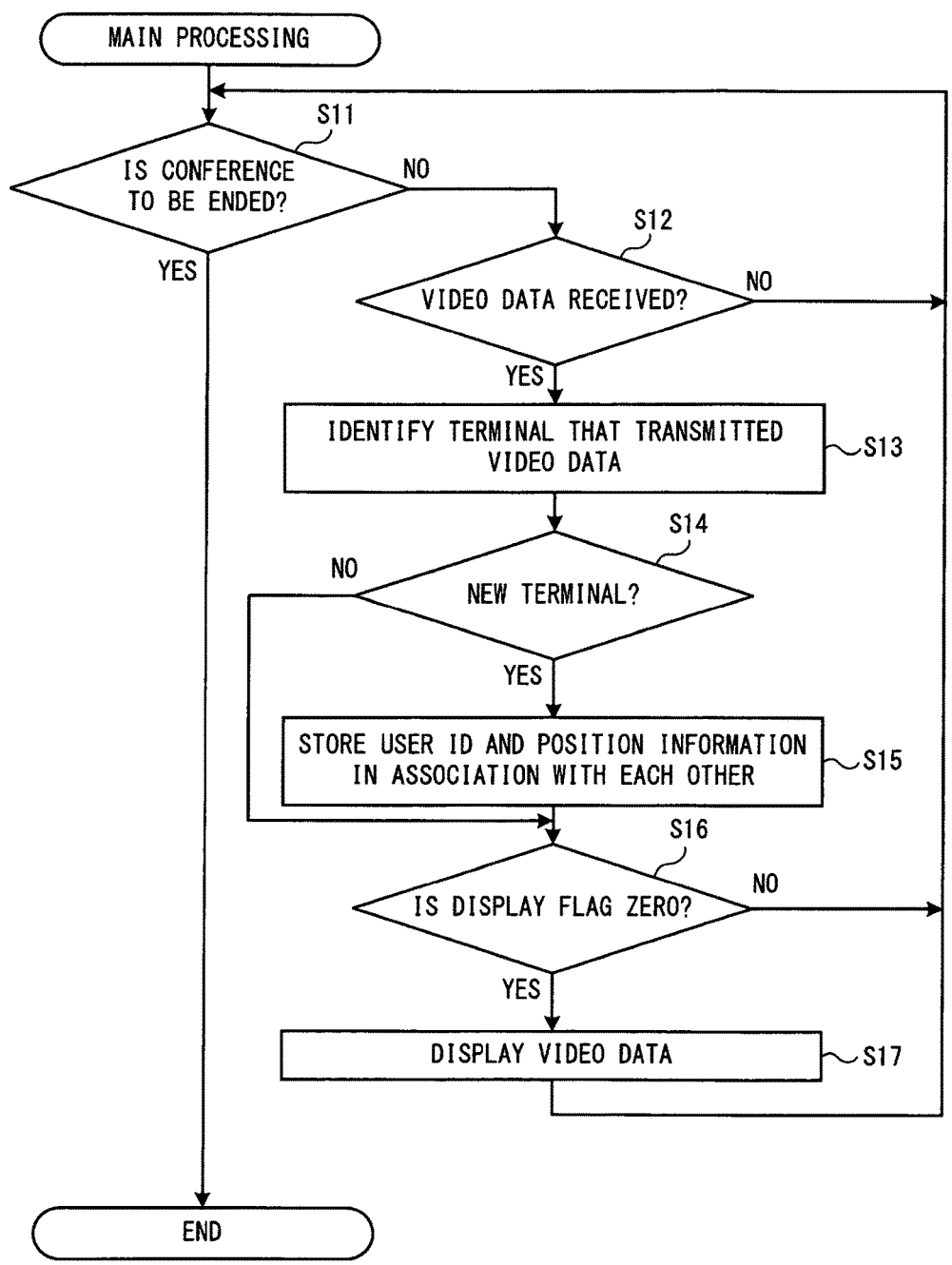
FIG. 4 is a flowchart of main processing.

As shown in FIG. 4, when the main processing is executed, based on an operation received by the input portion 128, the CPU 121 of the terminal 12 determines whether a command to end the conference has been detected (step S11). When it is determined that the command to end the conference has been detected (yes at step S11), the CPU 121 transmits, to the server 11, a notification indicating that the terminal 12 is to exit the conference room, and ends the main processing. When it is determined that the command to end the conference has not been detected (no at step S11), the CPU 121 determines whether the video data 202B has been received from any one of the other terminals 12 via the server 11 (step S12). When it is determined that the video data 202B has not been received from any one of the other terminals 12 (no at step S12), the CPU 121 returns the processing to the determination at step S11. When it is determined that the video data 202B has been received from one of the other terminals 12 (yes at step S12), the CPU 121 identifies the terminal 12 that transmitted the received video data 202B (step S13). The CPU 121 identifies the terminal 12 using the user ID attached to the video data 202B, for example.

Next, the CPU 121 determines whether the identified terminal 12 is a new terminal (step S14). When the user ID corresponding to the identified terminal 12 is stored in the RAM 123 in processing at step S15 (described below), it is determined that the identified terminal 12 is not the new terminal. When the user ID corresponding to the identified terminal 12 is not stored in the RAM 123, it is determined that the identified terminal 12 is the new terminal. When it is determined that the identified terminal 12 is not the new terminal (no at step S14), the CPU 121 moves the processing to a determination at step S16. When it is determined that the identified terminal 12 is the new terminal (yes at step S14), the CPU 121 stores, in the RAM 123, the user ID of the identified terminal 12 and position information in association with each other (step S15). The position information is information indicating a position in which the video data 202B etc. is displayed in the video window 20B. The position information is defined, for example, as a range represented by horizontal direction coordinates and vertical direction coordinates in the video window 20B.

Next, the CPU 121 determines whether "0" is stored in the RAM 123 as the display flag (step S16). When it is determined that "0" is not stored in the RAM 123 as the display flag (no at step S16), the CPU 121 returns the processing to the determination at step S11. When it is determined that "0" is stored in the RAM 123 as the display flag (yes at step S16), the CPU 121 causes the display 126 to display the received video data 202B in the video window 20B of the terminal 12 (step S17). In the RAM 123, the position information is stored in association with the user ID of the identified terminal 12. At step S17, the CPU 121 causes the display 126 to display the received video data 202B in the video window 20B of the terminal 12 based on the position information corresponding to the user ID of the identified terminal 12. Next, the CPU 121 returns the processing to the determination at step S11.

First presenter processing will be explained with reference to FIG. 5. The first presenter processing is started by the CPU 121 of the terminal 12 that commands the activation of the document sharing function, when the specific document data is designated and the document sharing function is activated. In the above-described specific example, the first presenter processing is executed by the CPU 121 of the terminal 12A.

Figure 5:
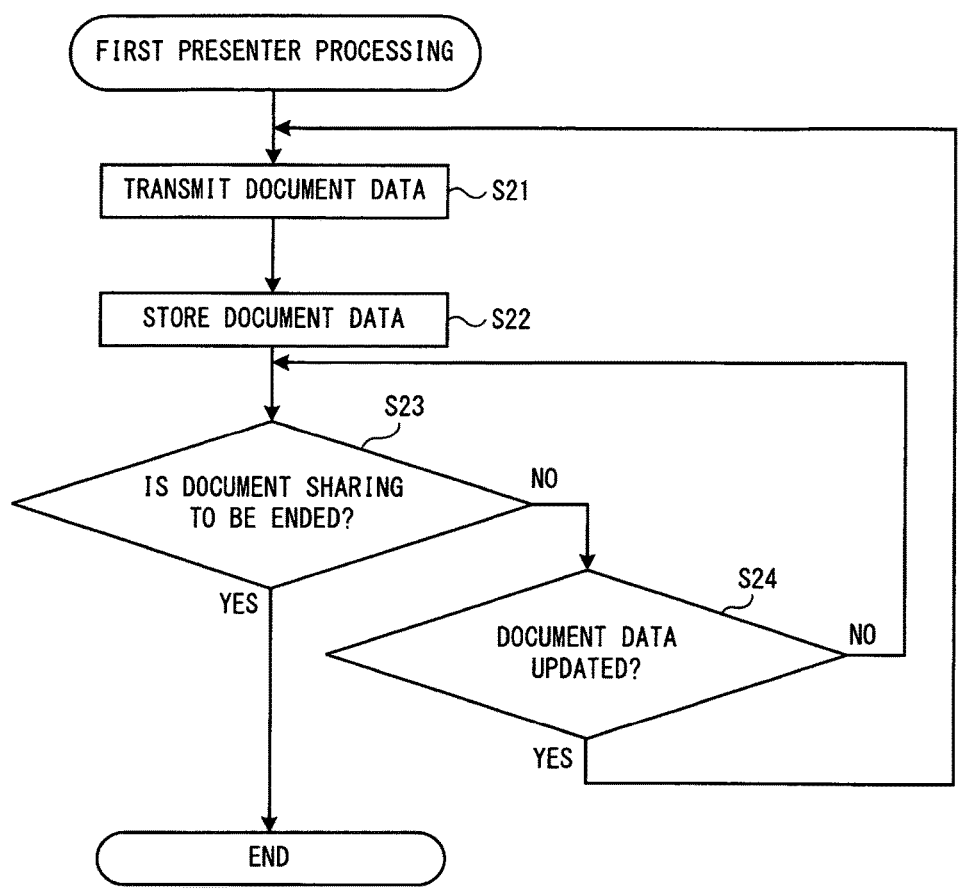
FIG. 5 is a flowchart of first presenter processing.

As shown in FIG. 5, when the first presenter processing is executed, the CPU 121 transmits the designated document data to the terminals 12B and 12C via the server 11 (step S21). Next, the CPU 121 stores the transmitted document data in the RAM 123 (step S22). As an example of the document sharing function, a sharing function can be given in which a specific application window or desktop is captured and the captured image data is transmitted. In this case, the document data is the captured image data. As another example of the document sharing function, a sharing function can be given in which a specific file is transmitted. In this case, the document data is the file itself.

Next, the CPU 121 determines whether a command to end sharing of the document data has been detected (step S23). When it is determined that the command to end the sharing of the document data has been detected (yes at step S23), the CPU 121 ends the first presenter processing. When it is determined that the command to end the sharing of the document data has not been detected (no at step S23), the CPU 121 determines whether the document data has been updated (step S24). For example, it is determined that the document data has been updated when the currently displayed document data has been changed to new document data.

When it is determined that the document data has not been updated (no at step S24), the CPU 121 returns the processing to the determination at step S23. When it is determined that the document data has been updated (yes at step S24), the CPU 121 returns the processing to the processing at step S21.

Second presenter processing will be explained with reference to FIG. 6. The second presenter processing is started by the CPU 121 of the terminal 12 that commands the activation of the document sharing function, when the specific document data is designated and the document sharing function is activated. In the above-described specific example, the second presenter processing is executed by the CPU 121 of the terminal 12A.

Figure 6:
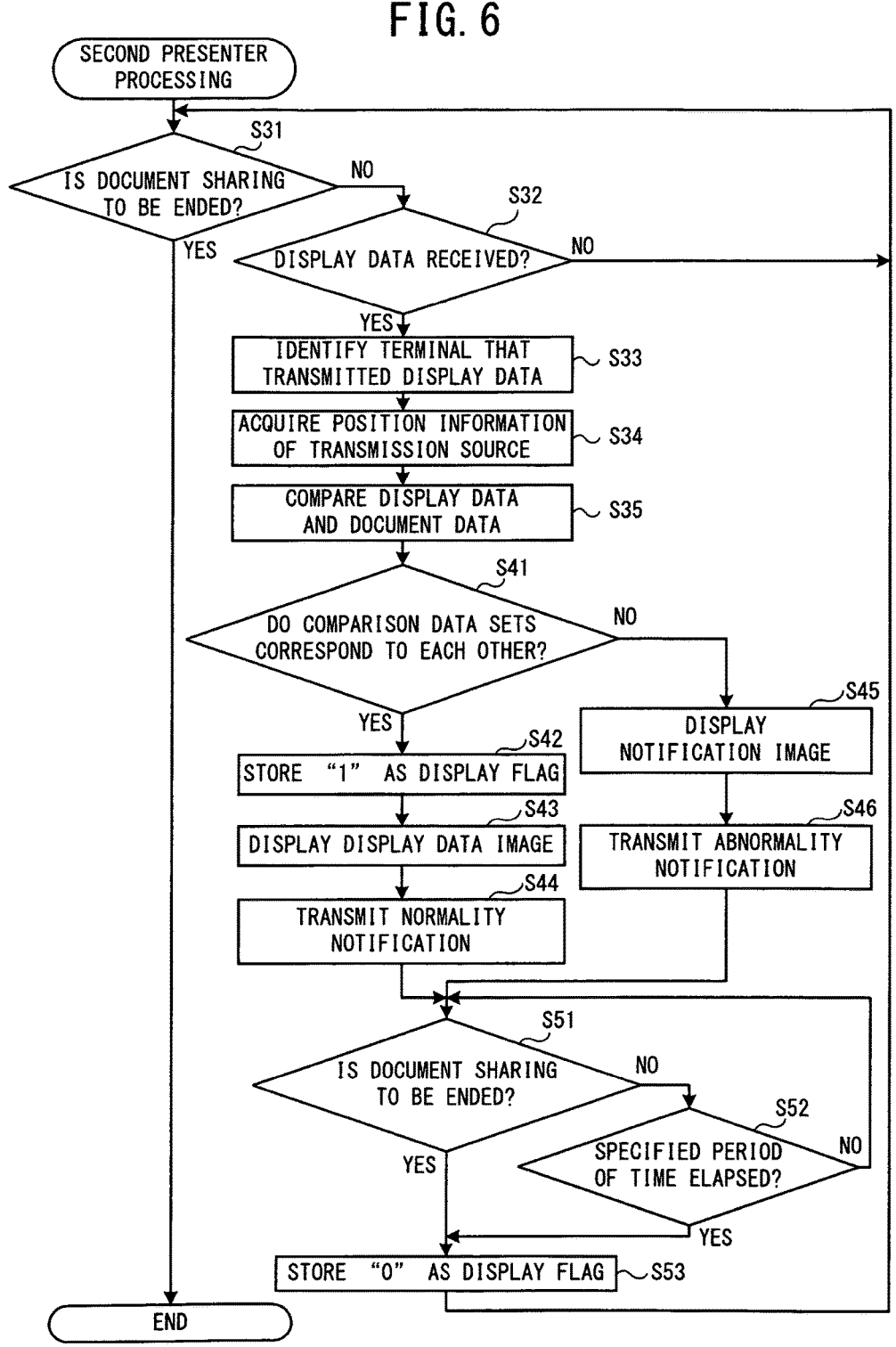
FIG. 6 is a flowchart of second presenter processing.

As shown in FIG. 6, when the second presenter processing is executed, the CPU 121 determines whether the command to end the sharing of the document data has been detected (step S31). When it is determined that the command to end the sharing of the document data has been detected (yes at step S31), the CPU 121 ends the second presenter processing. When it is determined that the command to end the sharing of the document data has not been detected (no at step S31), the CPU 121 determines whether state information (e.g., the display data) has been received from one of the terminals 12B and 12C via the server 11 (step S32). The display data is data used to display, on the terminal 12 that has transmitted the display data, the document data transmitted from the terminal 12A as the document data image 201. The display data is generated in processing at step S71 of first participant processing (described below). Information, such as a size of the image, a page number, etc. may be attached to the display data.

When it is determined that the display data has not been received from either one of the terminals 12B or 12C (no at step S32), the CPU 121 returns the processing to the determination at step S31. When it is determined that the display data has been received from one of the terminals 12B and 12C (yes at step S32), the CPU 121 identifies the terminal 12 that has transmitted the received display data (step S33). The CPU 121 identifies the terminal 12 that has transmitted the display data by referring to the user ID attached to the received display data, for example.

Next, the CPU 121 refers to the position information stored in the RAM 123 in the processing at step S15 (refer to FIG. 4), and acquires the position information corresponding to the user ID of the terminal 12 identified in the processing at step S33 (step S34). After that, in order to determine whether an appropriate image is displayed in the document window 20A of the identified terminal 12, the CPU 121 compares the received display data with the document data stored in the RAM 123 by the processing at step S22 (refer to FIG. 5) (step S35). Hereinafter, the mutually compared display data and document data are collectively referred to as comparison data sets. Images indicated by the comparison data sets are referred to as comparison images. When the document data is the captured image data, the document data itself may be used as the display data. When the document data is the specific file, data generated based on the file may be used as the display data.

Next, the CPU 121 determines whether the comparison data sets correspond to each other (step S41). When the document data image 201 based on the document data transmitted by the terminal 12A is appropriately displayed in the document window 20A of the identified terminal 12, it is determined that the comparison data sets correspond to each other. When the document data image 201 based on the document data transmitted by the terminal 12A is not appropriately displayed in the document window 20A of the identified terminal 12, it is determined that the comparison data sets do not correspond to each other.

It may be determined that the comparison data sets correspond to each other, for example, when the comparison images match due to an linear transformation of the comparison images (e.g., a shift, a rotation, or scaling of the images). Specifically, using a known filter (Sobel, Laplacian, for example), edge patterns may be respectively extracted from the comparison images. The edge patterns of the comparison images may be compared using a known template matching method, and it may thus be determined whether the comparison images correspond to each other.

Another method may be used to determine whether the comparison data sets correspond to each other. For example, it may be determined that the comparison data sets correspond to each other when page numbers of the comparison images match. It may be determined that the comparison data sets correspond to each other when at least one of the comparison images is rotated and the comparison images thus match each other. It may be determined that the comparison data sets correspond to each other when the comparison images match each other due to changing shading of the comparison images. It may be determined that the comparison data sets correspond to each other when specific areas, such as central portions, of the comparison images match. It may be determined that the comparison data sets correspond to each other when specific images, such as icons or the like, included in the comparison images match. It may be determined that the comparison data sets correspond to each other when the comparison images match each other as a result of scrolling. A certain range of difference may be accorded to the comparison images. In this case, it may be determined that the comparison data sets correspond to each other when the comparison images match each other within the certain range. An OCR (optical character recognition) function etc. may be used and character strings, numerals, or symbols included in the comparison images may be recognized. It may be determined whether the comparison data sets correspond to each other by comparing the recognized character strings, numerals, or symbols. It may be determined whether the comparison data sets correspond to each other by comparing feature quantities of the comparison images.

When it is determined that the comparison data sets correspond to each other (yes at step S41), the CPU 121 stores "1" in the RAM 123 as the display flag (step S42). Next, the CPU 121 causes the display 126 to display the display data image 203 (refer to FIG. 2) based on the received display data, in the video window 20B (step S43). At step S43, the CPU 121 causes the display 126 to display the display data image 203 (refer to FIG. 2) in the video window 20B based on the position information corresponding to the user ID of the identified terminal 12. Next, the CPU 121 transmits a normality notification to the identified terminal 12, via the server 11 (step S44). The normality notification is a notification indicating that the document data image 201 based on the document data transmitted by the terminal 12A is appropriately displayed in the document window 20A of the identified terminal 12. Next, the CPU 121 moves the processing to a determination at step S51.

The video data 202B is displayed in the video window 20B based on the position information corresponding to the user ID of the identified terminal 12. When it is determined that the comparison data sets do not correspond to each other (no at step S41), the CPU 121 causes the display 126 to display the notification image 204 (refer to FIG. 2) such that the notification image 204 is superimposed on the video data 202B displayed in the video window 20B (step S45). Next, the CPU 121 transmits an abnormality notification to the identified terminal 12, via the server 11 (step S46). The abnormality notification is a notification indicating that the document data image 201 based on the document data transmitted by the terminal 12A is not appropriately displayed in the document window 20A of the identified terminal 12.

The CPU 121 next determines whether the command to end the sharing of the document data has been detected (step S51). When it is determined that the command to end the sharing of the document data has not been detected (no at step S51), the CPU 121 determines whether a specified period of time has elapsed from when the display data image 203 is displayed in the video window 20B in the processing at step S43 (step S52). The specified period of time is, for example, approximately 5 seconds, but is not limited to this example. The specified period of time may be longer than 5 seconds, or may be shorter than 5 seconds. When it is determined that the specified period of time has not elapsed from when the display data image 203 is displayed in the video window 20B in the processing at step S43 (no at step S52), the CPU 121 returns the processing to the determination at step S51.

When it is determined that the command to end the sharing of the document data has been detected (yes at step S51), the CPU 121 stores "0" in the RAM 123 as the display flag (step S53). Moreover, when it is determined that the specified period of time has elapsed from when the display data image 203 is displayed in the video window 20B in the processing at step S43 (yes at step S52), the CPU 121 stores "0" in the RAM 123 as the display flag (step S53). The display data image 203 displayed in the video window 20B is switched to the received video data 202B and the received video data 202B is displayed. Next, the CPU 121 returns the processing to the processing at step S31. When the display data image 203 is not displayed (when the display flag is "0"), the CPU 121 determines, in the processing at step S52, that the specified period of time has elapsed (yes at step S52). After that, the CPU 121 returns the processing to step S31 with the display flag left as "0" (step S53).

First participant processing will be explained with reference to FIG. 7. The first participant processing is started by the CPU 121 of the terminal 12 participating in the conference room, when the conference application is activated. In the above-described specific example, the first participant processing is executed by the CPUs 121 of the terminals 12A to 12C.

Figure 7:
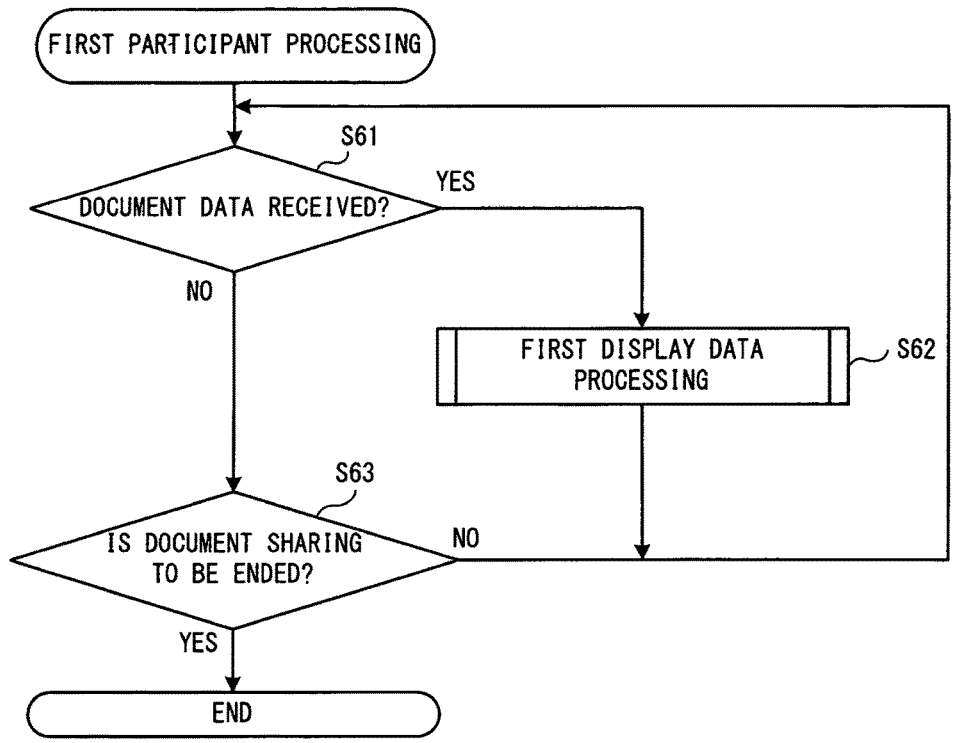
FIG. 7 is a flowchart of first participant processing.

As shown in FIG. 7, when the first participant processing is executed, the CPU 121 determines whether the document data transmitted by the terminal 12A in the processing at step S21 has been received via the server 11 (step S61). When it is determined that the document data has been received (yes at step S61), the CPU 121 executes first display data processing (step S62). The first display data processing will be explained below with reference to FIG. 8. After ending the first display data processing, the CPU 121 returns the processing to the determination at step S61. When it is determined that the document data has not been received (no at step S61), the CPU 121 determines whether the command to end the sharing of the document data has been detected (step S63). When it is determined that the command to end the sharing of the document data has been detected (yes at step S63), the CPU 121 ends the first participant processing. When it is determined that the command to end the sharing of the document data has not been detected (no at step S63), the CPU 121 returns the processing to the determination at step S61.

Figure 8:
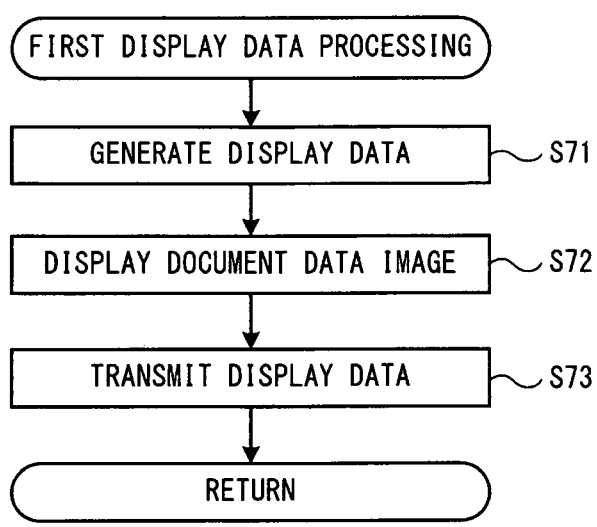
FIG. 8 is a flowchart of first display data processing.

The first display data processing will be explained with reference to FIG. 8. When the first display data processing is executed, the CPU 121 generates the display data based on the received document data (step S71). For example, the CPU 121 creates the display data by carrying out processing on the image represented by the document data, such as expanding or contracting the image, by acquiring only specific information from the document data, or by converting the document data to a specified file format etc. Then, based on the generated display data, the CPU 121 causes the display 126 to display the document data image 201 in the document window 20A (step S72). There is a case in which the document data image 201 displayed in the document window 20A of the terminal 12A is different from the document data image 201 displayed in the document windows 20A of the terminals 12B and 12C. Next, the CPU 121 transmits the generated display data to the terminal 12A via the server 11 (step S73). The CPU 121 then ends the first display data processing and returns the processing to the first participant processing (refer to FIG. 7).

Second participant processing will be explained with reference to FIG. 9. The second participant processing is started by the CPU 121 of the terminal 12 participating in the conference room, when the conference application is activated. In the above-described specific example, the second participant processing is executed by the CPUs 121 of the terminals 12A to 12C.

Figure 9:
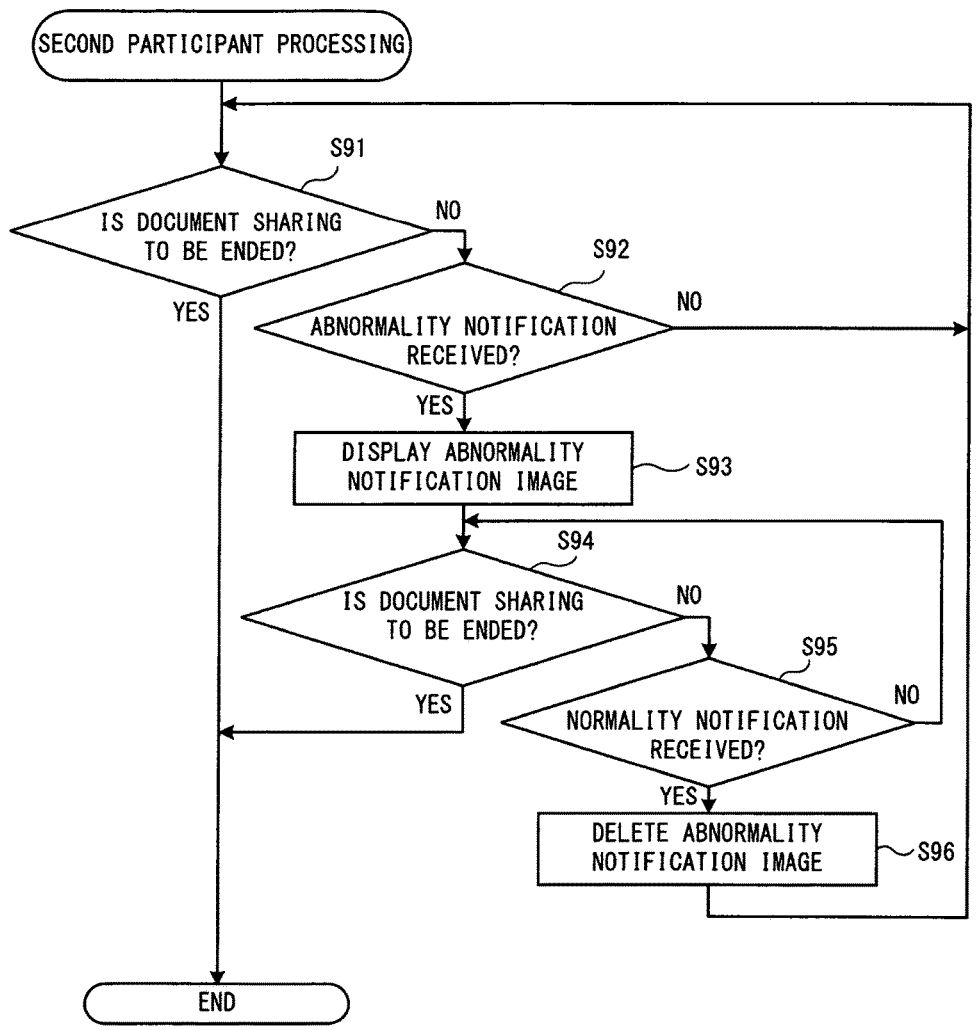
FIG. 9 is a flowchart of second participant processing.

As shown in FIG. 9, when the second participant processing is executed, the CPU 121 determines whether the command to end the sharing of the document data has been detected (step S91). When it is determined that the command to end the sharing of the document data has been detected (yes at step S91), the CPU 121 ends the second participant processing. When it is determined that the command to end the sharing of the document data has not been detected (no at step S91), the CPU 121 determines whether the abnormality notification has been received from the terminal 12A via the server 11 (step S92). When it is determined that the abnormality notification has not been received from the terminal 12A (no at step S92), the CPU 121 returns the processing to the determination at step S91. When it is determined that the abnormality notification has been received from the terminal 12A (yes at step S92), the CPU 121 causes the display 126 to display the abnormality notification image 206 (refer to FIG. 3) on the display 126 (step S93).

Next, the CPU 121 determines whether the command to end the sharing of the document data has been detected (step S94). When it is determined that the command to end the sharing of the document data has been detected (yes at step S94), the CPU 121 ends the second participant processing. When it is determined that the command to end the sharing of the document data has not been detected (no at step S94), the CPU 121 determines whether the normality notification has been received from the terminal 12A via the server 11 (step S95). When it is determined that the normality notification has not been received from the terminal 12A (no at step S95), the CPU 121 returns the processing to the determination at step S94. When it is determined that the normality notification has been received from the terminal 12A (yes at step S95), the CPU 121 deletes the abnormality notification image 206 being displayed on the display 126 (step S96). The CPU 121 then returns the processing to the determination at step S91.

Main Effects of Embodiment

As explained above, in the above-described embodiment, when it is determined that the comparison data sets correspond to each other (yes at step S41), the CPU 121 causes the display 126 to display the display data image 203 based on the received display data in the video window 20B (step S43). At step S43, the CPU 121 causes the display 126 to display the display data image 203 in the video window 20B based on the position information corresponding to the user ID of the identified terminal 12. When it is determined that the comparison data sets do not correspond to each other (no at step S41), the CPU 121 causes the display 126 to display the notification image 204 such that the notification image 204 is superimposed on the video data 202B displayed in the video window 20B, based on the position information corresponding to the user ID of the identified terminal 12 (step S45).

In this way, the presenter 13A can know that the appropriate image is displayed in the document window 20A of the terminal 12 corresponding to the position in which the display data image 203 is displayed. The presenter 13A can know that the appropriate image is not displayed in the document window 20A of the terminal 12 corresponding to the position in which the notification image 204 is displayed superimposed on the video data 202B.

In the above-described embodiment, when it is determined that the specified period of time has elapsed from when the display data image 203 is displayed in the video window 20B of the terminal 12A in the processing at step S43 (yes at step S52), the CPU 121 of the terminal 12A stores "0" as the display flag (step S53). In this way, the presenter 13A can know that the appropriate image is being displayed in the document windows 20A of the terminals 12B and 12C. After that, the presenter 13A can perform the remote conference while visually checking the participants 13B and 13C displayed based on the video data 202B.

In the above-described embodiment, when it is determined that the document data has been updated (yes at step S24), the CPU 121 transmits the document data to be shared to the terminals 12B and 12C via the server 11 (step S21). The CPU 121 receives the display data from the terminals 12B and 12C, respectively (step S32). The CPU 121 causes the display 126 to display an image in the video window 20B in accordance with the received display data (step S43, S45). In this way, at a time at which the document data is updated, the presenter 13A can know that the appropriate images are being displayed in the document windows 20A of the terminals 12B and 12C.

In the above-described embodiment, when it is determined that the comparison data sets correspond to each other (yes at step S41), the CPU 121 transmits the normality notification to the terminal 12 that generated the compared display data (step S44). When it is determined that the comparison data sets do not correspond to each other (no at step S41), the CPU 121 transmits, via the server 11, the abnormality notification to the terminal 12 that generated the compared display data (step S46). In this manner, the terminal 12A can notify the terminals 12B and 12C whether the appropriate images are being displayed in the document windows 20A of the terminals 12B and 12C, respectively. Thus, the participants 13B and 13C can know whether the appropriate images are being displayed in the document windows 20A of the terminals 12B and 12C, respectively, based on the document data transmitted from the terminal 12A.

MODIFIED EXAMPLES

Figure 10:
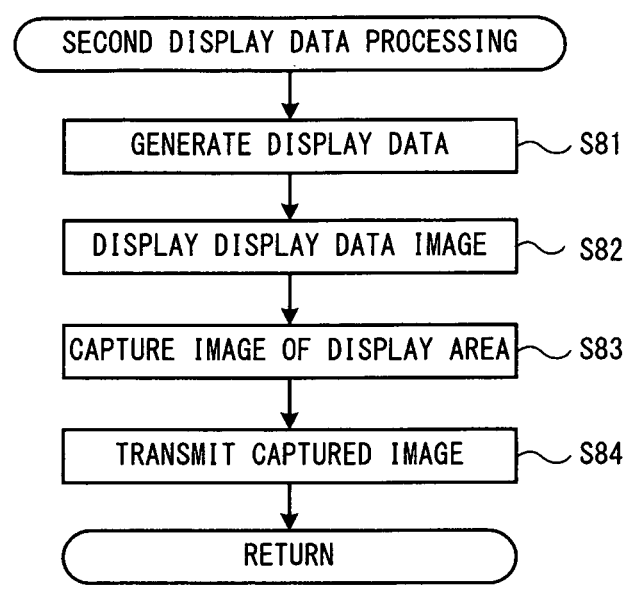
FIG. 10 is a flowchart of second display data processing.

Various modifications can be made to the above-described embodiment. For example, in the above-described embodiment, in place of executing the first display data processing in the processing at step S62, the CPU 121 may execute second display data processing shown in FIG. 10. Hereinafter, the second display data processing will be explained with reference to FIG. 10.

When the second display data processing is executed, the CPU 121 generates the display data (step S81). Next, the CPU 121 causes the display 126 to display, in the document window 20A displayed on the display 126, the display data image 203 based on the generated display data (step S82). The CPU 121 then captures the document window 20A (step S83). After that, the CPU 121 transmits the captured image to the terminal 12A (step S84). Next, the CPU 121 ends the second display data processing and returns the processing to the first participant processing (refer to FIG. 7).

In this case, the images actually displayed on the displays 126 of the terminals 12B and 12C are transmitted to the terminal 12A. Therefore, the presenter 13A can reliably know whether the participants 13B and 13C are looking at the appropriate image.

In the above-described embodiment, the first presenter processing need not necessarily include the processing at step S22. The second presenter processing need not necessarily include the processing at steps S35, S41, and S44 to S46. In this case, after the processing at step S34, the processing at steps S42 and S43 may be executed and the determination at step S51 may be performed. Therefore, the CPU 121 may display the display data image 203 in the video window 20B of the display 126 based on the position information corresponding to the identified terminal 12, irrespective of whether the comparison data sets correspond to each other.

Here, for example, it is assumed that the user 13A using the terminal 12A makes a presentation while sharing the document data between the plurality of terminals 12. In this case, the terminal 12A may display display states of the document windows 20A of the terminals 12B and 12C in the video window 20B of the terminal 12A based on the respective position information of the terminals 12B and 12C. In this way, in the remote conference, based on the display data sets received from the terminals 12B and 12C, the terminal 12A may display the display data images 203 in display positions corresponding to the terminals 12B and 12C, respectively. As a result, the presenter 13A can reliably know whether the participants 13B and 13C are looking at the appropriate image.

In the above-described embodiment, the second presenter processing need not necessarily include the processing at steps S45 and S46. In this case, when it is determined that the comparison data sets do not correspond to each other (no at step S41), the CPU 121 of the terminal 12A may move the processing to the determination at step S51. Thus, when the comparison data sets do not correspond to each other, the CPU 121 of the terminal 12A may display the display data image 203 in the video window 20B of the terminal 12A based on the position information corresponding to the terminal 12. Here, when the comparison data sets do not correspond to each other, the notification image 204 may be not displayed in the area based on the position information corresponding to the terminal 12, and the video window 20B may be displayed as it is.

In this case, the presenter 13A can know that the appropriate image is being displayed in the terminal 12 corresponding to the display position in which the video data 202B has switched to the display data image 203. The presenter 13A can know that the appropriate image is not being displayed in the terminal 12 corresponding to the display position in which the video data 202B has not switched to the display data image 203. For example, it is assumed that, instead of the document data image 201, an image that should not be seen by other parties, such as confidential data, is displayed in the document windows 20A of the terminals 12B and 12C. In this case, the confidential data etc. is not seen by the presenter 13A. Further, by looking at the video data 202B, the presenter 13A can know the user 13 of the terminal 12 on which the appropriate image is not being displayed.

In the above-described embodiment, the second presenter processing need not necessarily include the processing at steps S42 and S43. In this case, when it is determined that the comparison data sets correspond to each other (yes at step S41), the CPU 121 may move the processing to the processing at step S44. When the comparison data sets do not correspond to each other, the CPU 121 may display the notification image 204 in the video window 20B based on the position information corresponding to the terminal 12 (step S45). Here, when the comparison data sets correspond to each other, the display data image 203 may be not displayed in the area based on the position information corresponding to the terminal 12, and the video data 202B may be displayed as it is.

In this case, the presenter 13A can know that the appropriate image is being displayed in the terminal 12 corresponding to the display position in which the notification image 204 is not displayed. The presenter 13A can know that the appropriate image is not being displayed in the terminal 12 corresponding to the display position in which the notification image 204 is displayed. For example, it is assumed that instead of the display data image 203, an image that should not be seen by other parties, such as confidential data, is displayed in the document windows 20A of the terminals 12B and 12C. In this case, the confidential data etc. is not seen by the presenter 13A.

In the above-described embodiment, the first participant processing need not necessarily include the processing at step S63. The first participant processing is executed when the terminal 12A transmits the document data. In this case, the CPU 121 ends the first participant processing after ending the first display data processing. Thus, the CPU 121 may execute one of the first display data processing and the second display data processing based only on the document data that is initially received.

In the remote conference, when the document sharing function has been activated, there is a case in which the document data that is initially received is not appropriately displayed in the document window 20A. If the initially received document data is appropriately displayed in the document window 20A, the subsequent updated document data are appropriately displayed in most cases. This is because the reliability of the communication between the terminals 12 can be secured by once displaying the appropriate image. Thus, when the document sharing function has been activated, the CPU 121 of the terminal 12A may execute one of the first display data processing and the second display data processing based only on the initially received document data. In this way, the presenter 13A can know whether the appropriate image is being displayed in the document windows 20A of the terminals 12B and 12C based on the initially received document data. After that, the presenter 13A can perform the remote conference while visually checking the participants 13B and 13C displayed based on the video data 202B.

In the above-described embodiment, in the processing at step S43 of the second presenter processing, the CPU 121 causes the display 126 to display the display data image 203 based on the position information corresponding to the user ID of the identified terminal 12. At step S43, the CPU 121 may cause the display data image 203 to be transparent, and may display the display data image 203 such that the display data image 203 is superimposed on the video data 202B displayed in the video window 20B. In this case, the presenter 13A can constantly visually check the video data 202B transmitted from the terminals 12B and 12C.

In the above-described embodiment, in the display positions based on the position information, the CPU 121 of the terminal 12A may constantly display only specific information (such as the page number etc.) of the document data image 201 displayed in the document windows 20A of the terminals 12B and 12C, as the display data image 203 or the notification image 204. In this case, the presenter 13A can constantly know whether the appropriate images are being displayed in the document windows 20A of the terminals 12B and 12C. By displaying only the specific information, it is possible to reduce the display area and the remote conference can be performed while visually checking the participants 13B and 13C displayed based on the video data 202B.

In the above-described embodiment, the second presenter processing need not necessarily include the processing at step S35. In this case, after executing the processing at step S34, the determination at step S41 is executed. For example, another device may perform the comparison of the display data and the document data. The CPU 121 may execute the determination at step S41 based on the comparison result. Furthermore, the CPUs 121 of the terminals 12B and 12C may perform the comparison of the display data and the document data. The terminals 12B and 12C may generate the video data 202B, on which an image corresponding to the comparison result is superimposed, and transmit the generated video data 202B to the terminal 12A. In this case, the terminal 12A need not necessarily include the determination at step S41 in the second presenter processing. In this case, the CPU 121 of the terminal 12A may display the video data 202B, on which an image corresponding to the comparison result of the display data and the document data is superimposed, as it is on the display 126. The presenter 13A can know whether the appropriate images are being displayed in the document windows 20A of the terminals 12B and 12C based on the document data.

In the above-described embodiment, in place of the video data 202B, the CPU 121 of the terminal 12A may receive a specific image indicating another of the terminals 12 in the processing at step S12. For example, a case can be conceived in which the terminal 12 that does not include a camera transmits an icon etc., which is registered in advance by the user 13 of that terminal 12, in place of the video data 202B. In this case, the specific image of the icon etc. is displayed in the display position based on the position information.

In the above-described embodiment, the first participant processing and the second participant processing may be executed by the terminals 12B and 12C when the terminals 12B and 12C have received, from the server 11, a notification that the document sharing function is executed, for example. The first participant processing and the second participant processing may be executed by the terminals 12B and 12C when the document data stored in the server 11 has been designated by the terminal 12A and the document data has been transmitted to the terminals 12B and 12C from the server 11.

In the above-described embodiment, in the processing at step S24, in the terminal 12A, there is a case in which a page of the document data image 201 currently being shared is changed, or the display area of the document data image 201 is changed due to scrolling, zooming in, zooming out, etc. In this type of case, it may be determined that the document data has been updated. In this case, the CPU 121 of the terminal 12A may notify the terminals 12B and 12C that the document has been updated. Next, the terminals 12B and 12C may transmit the display data to the terminal 12A.

In the above-described embodiment, in the terminals 12B and 12C, there is a case in which a page of the document data image 201 being currently shared is changed, or the display area is changed due to scrolling, zooming in, zooming out, etc. In this case, the CPU 121 of the terminal 12A may receive the display data or a captured image. In this case, the CPU 121 of the terminal 12A may receive the display data or the captured image when the changed page or the changed display area is displayed in the document window 20A for a specified period of time. The CPU 121 of the terminal 12A may receive the display data or the captured image when another window is displayed superimposed on the conference application window 20.

In the above-described embodiment, the transmission and the reception of the data, and the notification between the terminals 12 may be performed via the server 11, or may be performed without using the server 11.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions, the instructions, when executed by a processor of a presenter terminal configured to be connectable to a network, causing the presenter terminal to execute:

receiving, via a communication interface of the presenter terminal, identification information and video data relating to each of one or more participant terminals, the presenter terminal and the one or more participant terminals engaging in a remote conference by performing transmission and reception of data via the network;

storing, in a storage, the identification information for each participant terminal and position information in association with each other, the position information indicating a position in which the video data relating to the participant terminal is displayed on a display of the presenter terminal;

designating document data to be shared by the presenter terminal with each participant terminal;

transmitting, to the participant terminal via the communication interface, a command to display an image associated with the document data on a display of the participant terminal;

receiving state information from the participant terminal via the communication interface, the state information indicating a display state on the display of the participant terminal;

identifying, after receiving the state information from the participant terminal, position information associated with identification information of the participant terminal, based on the identification information and the position information stored in the storage;

determining whether an image displayed on the participant terminal corresponds to the image associated with the document data based on the state information; and displaying a notification image on the display of the presenter terminal based on the identified position information if the image displayed on the participant terminal does not correspond to the image associated with the document data based on the state information.

2. The non-transitory computer-readable medium according to claim 1, wherein the computer-readable instructions, when executed by the processor, further cause the presenter terminal to execute:

determining whether a display state of the presenter terminal and a display state of the participant terminal correspond to each other, based on a comparison of the display state of the presenter terminal and the display state of the participant terminal, the display state of the presenter terminal being a display state of the document data on the display of the presenter terminal, and the display state of the participant terminal being a display state indicated by the state information.

3. The non-transitory computer-readable medium according to claim 2, wherein the computer-readable instructions, when executed by the processor, further cause the presenter terminal to execute:

displaying a first image as a corresponding image, based on determining that the display state of the presenter terminal and the display state of the participant terminal correspond to each other; and displaying the notification image as the corresponding image, based on determining that the display state of the presenter terminal and the display state of the participant terminal do not correspond to each other, the notification image being different from the first image.

4. The non-transitory computer-readable medium according to claim 3, wherein the first image is an image reproducing a display state of the document data on the display of the participant terminal, and a second image corresponds to the video data received via the communication interface of the presenter terminal.

5. The non-transitory computer-readable medium according to claim 3, wherein the computer-readable instructions, when executed by the processor, further cause the presenter terminal to execute:

a switching operation of switching the image displayed on the display of the presenter terminal from the first image to a second image in a case where a specified period of time elapses from when the first image is displayed, and the second image is an image indicated by the video data received via the communication interface of the presenter terminal.

6. The non-transitory computer-readable medium according to claim 2, wherein the computer-readable instructions, when executed by the processor, further cause the presenter terminal to execute:

a transmission operation of transmitting a result notification to the participant terminal via the communication interface, the result notification indicating a result determined by determining whether the display state of the presenter terminal and the display state of the participant terminal correspond to each other.

7. The non-transitory computer-readable medium according to claim 1, wherein the transmitting, to the participant terminal, via the communication interface further comprises:

transmitting, to the participant terminal, via the communication interface, a command to display updated document data on the display of the participant terminal in a case where an operation to update the document data is received.

8. The non-transitory computer-readable medium according to claim 1, wherein the video data corresponds to video data captured by a camera of the participant terminal.

9. The non-transitory computer-readable medium according to claim 1, wherein the image that corresponds to the image associated with the document data based on the state information matches the image associated with the document data based on the state information.

10. A presenter terminal configured to be connectable to a network, the presenter terminal comprising:

a display;

a communication interface;

a processor; and a memory configured to store computer-readable instructions, wherein the computer-readable instructions, when executed by the processor, cause the presenter terminal to execute:

receiving, via the communication interface, identification information and video data relating to each of one or more participant terminals, the presenter terminal and the one or more participant terminals engaging in a remote conference by performing transmission and reception of data via the network;

storing, in a storage, the identification information for each participant terminal and position information in association with each other, the position information indicating a position in which the video data relating to the participant terminal is displayed on the display;

designating document data to be shared by the presenter terminal with each participant terminal;

transmitting, to the participant terminal, a command to display an image associated with the document data on a display of the participant terminal;

receiving state information from the participant terminal via the communication interface, the state information indicating a display state on the display of the participant terminal;

identifying, after receiving the state information from the participant terminal, position information associated with identification information of the participant terminal, based on the identification information and the position information stored in the storage;

determining whether an image displayed on the participant terminal corresponds to the image associated with the document data based on the state information; and displaying a notification image on the display of the presenter terminal based on the identified position information if the image displayed on the participant terminal does not correspond to the image associated with the document data based on the state information.

11. A method of controlling a presenter terminal configured to be connectable to a network, the method comprising:

receiving, via a communication interface of the presenter terminal, identification information and video data relating to each of one or more participant terminals, the presenter terminal and the one or more participant terminals engaging in a remote conference by performing transmission and reception of data via the network;

storing, in a storage, the identification information for each participant terminal and position information in association with each other, the position information indicating a position in which the video data relating to the participant terminal is displayed on a display of the presenter terminal;

designating document data to be shared by the presenter terminal with each participant terminal;

transmitting, to the participant terminal via the communication interface, a command to display an image associated with the document data on a display of the participant terminal;

receiving state information from the participant terminal via the communication interface, the state information indicating a display state on the display of the participant terminal;

identifying, after receiving the state information from the participant terminal, position information associated with identification information of the participant terminal, based on the identification information and the position information stored in the storage;

determining whether an image displayed on the participant terminal corresponds to the image associated with the document data based on the state information; and displaying a notification image on the display of the presenter terminal based on the identified position information if the image displayed on the participant terminal does not correspond to the image associated with the document data based on the state information.

* * * * *